United States Patent
Schiessl et al.

(10) Patent No.: US 10,222,466 B2
(45) Date of Patent: Mar. 5, 2019

(54) METHOD AND A DEVICE FOR DETECTING AN ALL-ROUND VIEW

(71) Applicant: Rohde & Schwarz GmbH & Co. KG, Munich (DE)

(72) Inventors: Andreas Schiessl, Munich (DE); Christian Evers, Kirchheim (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 363 days.

(21) Appl. No.: 14/917,321

(22) PCT Filed: Dec. 8, 2014

(86) PCT No.: PCT/EP2014/076879
§ 371 (c)(1),
(2) Date: Mar. 8, 2016

(87) PCT Pub. No.: WO2015/086524
PCT Pub. Date: Jun. 18, 2015

(65) Prior Publication Data
US 2016/0223667 A1    Aug. 4, 2016

(30) Foreign Application Priority Data
Dec. 9, 2013  (DE) .......................... 10 2013 225 283

(51) Int. Cl.
*G01S 13/62* (2006.01)
*G01S 13/88* (2006.01)
(Continued)

(52) U.S. Cl.
CPC .............. *G01S 13/887* (2013.01); *G01S 7/40* (2013.01); *G01S 13/50* (2013.01); *G01S 13/62* (2013.01); *G01S 13/865* (2013.01); *G01S 13/89* (2013.01)

(58) Field of Classification Search
CPC ........ G01S 13/50; G01S 13/62; G01S 13/865; G01S 13/887; G01S 13/89; G01S 7/40
(Continued)

(56) References Cited

U.S. PATENT DOCUMENTS 6,057,761 A    5/2000   Yukl
6,965,340 B1   11/2005  Baharav et al.
(Continued)

FOREIGN PATENT DOCUMENTS

DE    102010014880 A1    11/2010
DE    102010051207 A1    5/2012
(Continued)

OTHER PUBLICATIONS

Notification of Transmittal of Translation of the International Preliminary Report on Patentability (Chapter I or Chapter II) for International Application No. PCT/EP2014/076879, dated Jul. 1, 2016, 12 Page.

*Primary Examiner* — Timothy A Brainard
(74) *Attorney, Agent, or Firm* — Ditthavong & Steiner, P.C.

(57) ABSTRACT

The present disclosure relates to a method for the registration of a 3-dimensional all-round view of a moving human or animal body surface. The method accordingly comprises the steps: determination (A) of a movement velocity of at least one region of the body surface and registration (B) at least of the region of the body surface at a timing point at which the value of the movement velocity of this region falls below a defined threshold value.

15 Claims, 5 Drawing Sheets

(51) Int. Cl.
   *G01S 7/40*    (2006.01)
   *G01S 13/50*   (2006.01)
   *G01S 13/86*   (2006.01)
   *G01S 13/89*   (2006.01)

(58) Field of Classification Search
   USPC .......................................................... 342/22
   See application file for complete search history.

(56) References Cited

U.S. PATENT DOCUMENTS

| | | | |
|---|---|---|---|
| 2006/0249679 A1* | 11/2006 | Johnson | G01C 3/08 |
| | | | 250/332 |
| 2006/0274919 A1 | 12/2006 | Loiacono et al. | |
| 2007/0263907 A1 | 11/2007 | McMakin et al. | |
| 2008/0170654 A1 | 7/2008 | Tkaczyk et al. | |
| 2010/0309370 A1* | 12/2010 | Ueshima | A63F 13/10 |
| | | | 348/371 |
| 2014/0067121 A1* | 3/2014 | Brooks | B25J 9/1676 |
| | | | 700/255 |

FOREIGN PATENT DOCUMENTS

| | | | |
|---|---|---|---|
| EP | 2204671 A1 | 7/2010 | |
| EP | 2589990 A1 | 5/2013 | |

\* cited by examiner

METHOD AND A DEVICE FOR DETECTING AN ALL-ROUND VIEW

CROSS-REFERENCE TO RELATED APPLICATIONS

The present application is a national phase application of PCT Application No. PCT/EP2014/076879, filed Dec. 8, 2014, which claims priority to German Patent Application No. 10 2013 225 283.8, filed on Dec. 9, 2013, the entire contents of which are herein incorporated by reference.

TECHNICAL FIELD

The present disclosure, according to the various embodiments described herein, relates to a method and a device for detecting a preferably three-dimensional all-round view of a moving human or animal body surface.

BACKGROUND

For security scanning of persons, for example, at airports, railway stations or public buildings, metal detectors are conventionally used. However, these are not capable of detecting objects not made from metal, for example, ceramic knives, guns or explosives manufactured from ceramic materials. While the luggage of flight passengers is generally analysed using x-ray radiation, an ionising x-ray radiation can be used for scanning flight passengers only to a limited extent because of the health risks.

In recent years, devices and systems based on microwave radiation have therefore been developed, which allow a rapid and reliable security scanning of persons. Such a system based upon a microwave radiation is known, for example, from U.S. Pat. No. 6,965,340 B1.

Furthermore, mapping the registered image data not directly but indirectly via a model and presenting them as a computer animation is known from DE 2010 014 880 A1. As a result, the private sphere of the persons under investigation is protected.

Body scanners which can scan a body surface in real-time in order to obtain a 3-D all-round view without producing motion-blurred images, necessitate imaging systems with a measurement time less than 1 ms and image repetition rates greater than 10 Hz. Such systems are technically very difficult to realise and also cost intensive, so that their use is questionable.

SUMMARY

An object of the present disclosure includes the registration of an all-round view of a body surface, especially when moving through a walk-through passageway. In this context, it is problematic that the moving body surface cannot be recorded in real-time, since especially the limbs of the human or animal body surface provide too rapid a movement velocity to be registered without motion-blurring. The registration should be capable of realisation with simple technical means and should be cost favourable.

In certain embodiments, a method for the registration of an all-round view of a moving human or animal body surface is provided. The method comprises the method steps: determination of a movement velocity of at least one region of the body surface and detection at least of the region of the body surface at a timing point at which the value of the movement velocity of this region falls below a defined value.

A three-dimensional all-round view is understood to be a three-dimensional display of a human or animal body surface which shows the body surface in its entirety at least within a rough grid.

The body surface of a moving human or animal body can therefore be advantageously registered, for example, during movement through a walk-through passageway. In this context, the fast movement velocity of individual regions of the body surface, which cannot be imaged without motion-blurring with existing detection equipment is problematic. If objects are concealed in these regions, they would remain undiscovered in security scans.

According to certain embodiments, it is therefore provided that the movement velocity of individual regions of the body surface is determined and only detected at a timing point at which the velocity falls below a defined threshold value. In this manner, a motion-blurred imaged region is avoided. The undercutting of the threshold value occurs, in particular, at a time of change in the direction of movement of a region to be detected, since the movement velocity falls to zero at exactly this point. A detection of the change of direction of movement at this point is therefore desirable.

In certain embodiments, before the step of determination, a region of the body surface already detected by means of microwave radiation is marked on the basis of a three-dimensional model. The step of detection further relates to an un-detected region of the body surface for the purpose of completing a 3-D all-round view. The detection is especially implemented by means of microwave radiation.

The completion of the 3-D all-round view is understood to mean that the regions indicated according to a comparison body surface have been detected as fully as possible. If regions of the 3-D all-round view which must be detected according to the comparison body surface have not been detected, a detection of the un-detected regions must be initiated.

In certain embodiments, the 3-D all-round view is provided on the basis of a dynamic 3-D model by means of follower-sensors, also referred to in the following as tracking sensors. In particular, the model is dynamic if the model changes during the movement of the body surface through the walk-through passageway with regard to regions to be detected, and a completely registered body surface is obtained at the end of the walk-through passageway.

In other embodiments, position vectors and/or movement vectors of individual regions of the body surface are evaluated in order to determine the movement velocity. This is particularly meaningful and efficient with regard to the finding of a zero point in a movement course of the respective region in order to identify an undercutting of the threshold value.

In certain embodiments, a step of evaluation is carried out before the step of marking, wherein the evaluation comprises a comparison of the actually detected body surface with a comparison surface. In this context, a comparison surface is a rudimentary body surface which comprises the regions to be detected, wherein the extent to which regions have not yet been detected is determined by means of the comparison.

In yet other embodiments, already registered motion-blurred regions of the body surface are marked as un-detected. This ensures that these motion-blurred regions are scanned again in order to detect objects potentially concealed in this region of the body surface.

The method is suitable for detecting non-body objects on the body surface. These include weapons, explosives and/or smuggled goods which, in a preferred embodiment, are non-metallic.

Furthermore, a device is provided for the detection of a 3-D all-round view of a human or animal body surface moving through a walk-through passageway. The device comprises at least one tracking sensor set up to track a body surface to be detected within the walk-through passageway. The device further comprises a marking unit to set up mark regions of the body surface and to place position vectors and movement vectors in the respective regions. The device further comprises a detection device for detecting at least one region of the body surface at a timing point at which the value of the movement velocity of this region falls below a defined threshold value.

In certain embodiments, the device further provides an evaluation unit which is set up to evaluate the position vectors and movement vectors in such a manner that the timing point can be determined.

In certain embodiments, the detection device is a microwave unit set up to detect the region to be detected.

In another embodiment, the tracking sensor comprises a three-dimensional, 3-D camera and/or a TOF camera. TOF cameras are 3-D camera systems which measure distances using the delay-time method, English: Time of Flight, abbreviation TOF. For this purpose, the walk-through passageway is illuminated by means of a light pulse, and, for every image point, the camera measures the time which the light requires to travel to the body surface and back again. The time required is directly proportional to the distance. For every image point, the TOF camera accordingly delivers the distance of the body surface. From the time and the distance measurement, it is then possible to infer the movement velocity of every individual image point. With this TOF camera, a whole scene can be recorded at once without the need for scanning. In particular, a plurality of tracking sensors are provided in order to allow an ideal evaluation of the body surface.

Accordingly, in certain embodiments, a plurality of detection devices are provided in order to prepare the 3-D all-round view.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

In the following, the present disclosure will be explained in greater detail with reference to the drawings. In this context, individual components have been presented in an exaggerated scale or respectively in an over-simplified manner. Components acting in the same manner have been marked with identical reference numbers. The drawings show.

DETAILED DESCRIPTION

Figure 1:
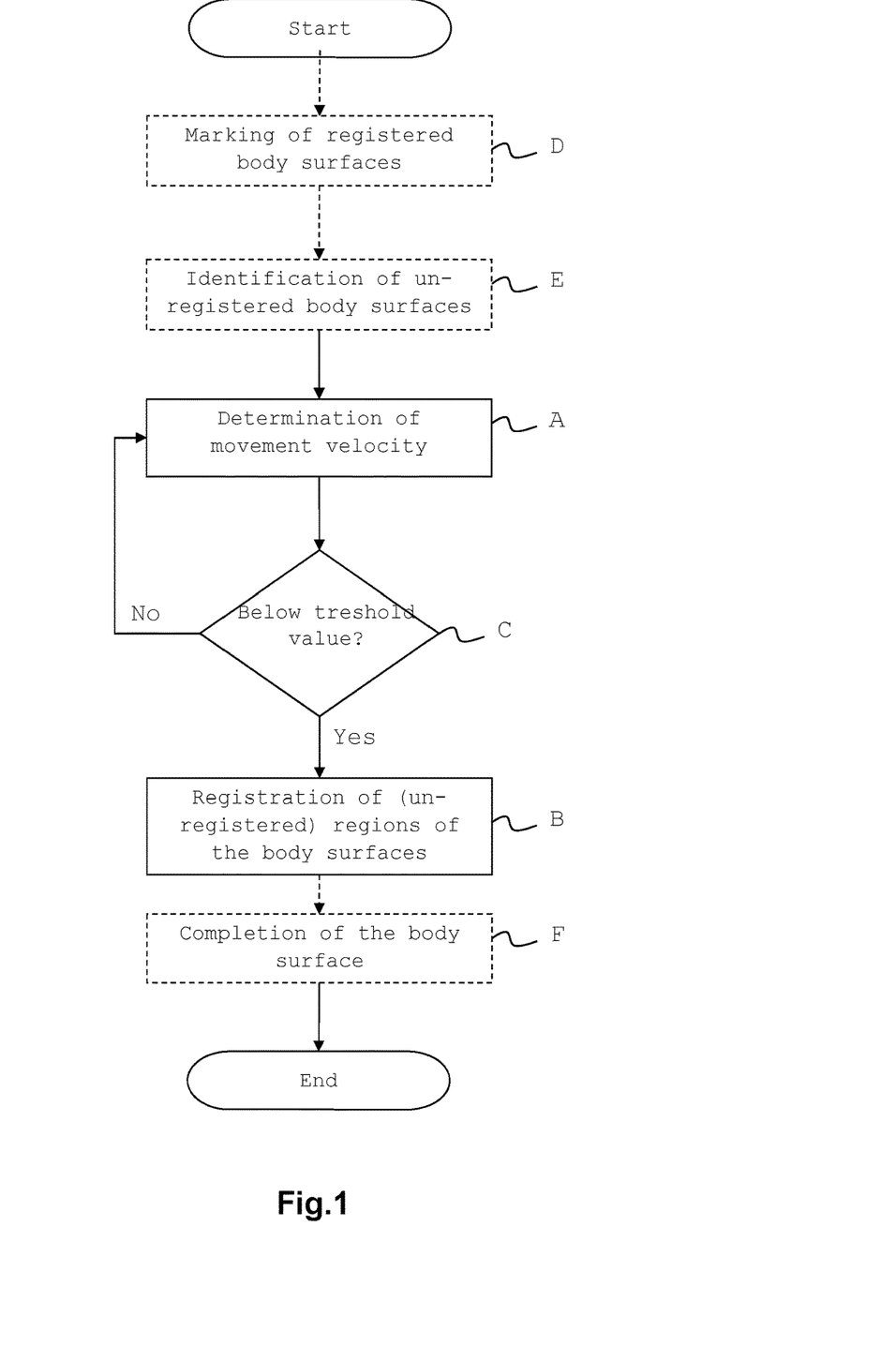
FIG. 1 a method flow diagram of a first exemplary embodiment is illustrated.

FIG. 1 shows a method flow diagram for a first exemplary embodiment. Optional steps are shown here with dashed lines and represent preferred variant embodiments of the method.

Initially, the movement velocity 10 of a region 2 of a body surface is determined in a step A. In a comparison step C, a comparison is carried out to determine whether the determined movement velocity 10 has fallen below a defined threshold value. In this context, the undercutting of the threshold value occurs especially at a change in the direction of movement of the region 2 in which the movement velocity 10 has fallen to a minimal value. At such a timing point, the registration of the region 2 can take place without the registered region 2 being motion-blurred. Under some circumstances, objects 4 which should have been discovered in the region 2 to be registered can remain undiscovered.

The method should be used, in certain embodiments, when a person 11 moves through a walk-through passageway 9 and, for example, because of the natural forward movement, the lower legs or arms provide a comparatively fast movement velocities 10 relative to the torso. Without great technical effort, such fast movement velocities 10 cannot be registered by the microwave-based registration devices 8 without motion-blurring. To achieve technically simple systems, the method according to the present disclosure should be used.

If the comparison step C shows that the movement velocity 10 of the region 2 of the body surface to be registered exceeds a threshold value, a registration B of the region 2 is not implemented, but the movement velocity 10 is determined again. If the region 2 cannot be registered because of the fast movement velocity 10, this can be immediately recognised in the 3-D all-round view 1, and a person 11 can be requested to move more slowly through the walk-through passageway or, alternatively, can be investigated separately.

In an alternative case, if the comparison step C shows that the threshold value for the movement velocity 10 has been undercut, a registration step B in which the region 2 of the body surface is registered is immediately implemented.

Furthermore, in preferred embodiments of the method according to FIG. 1, the steps D, E and F are provided. According to step D, a body surface is initially marked with regard to already registered regions 2a. In the following step E, un-registered regions 2b of the body surface are identified. Especially these un-registered regions 2b are to be determined by means of this method. In a final step F, the completion of the body surface is implemented in order to obtain a complete 3-D all-round view.

Through the registration B of these un-registered regions 2b, an incompletely registered body surface is completed in order to ensure that no objects 4 are disposed on the body surface which must be discovered within the context of a security scan.

Accordingly, it is included within the idea that, through the registration B of the un-registered regions 2b, already registered regions 2a are registered again. It is decided in an evaluation unit 12 whether the re-registered regions 2a must be updated in the 3-D all-round view 1 of the body surface or should simply be rejected, because the registered region 2a has already been displayed.

Figure 2:
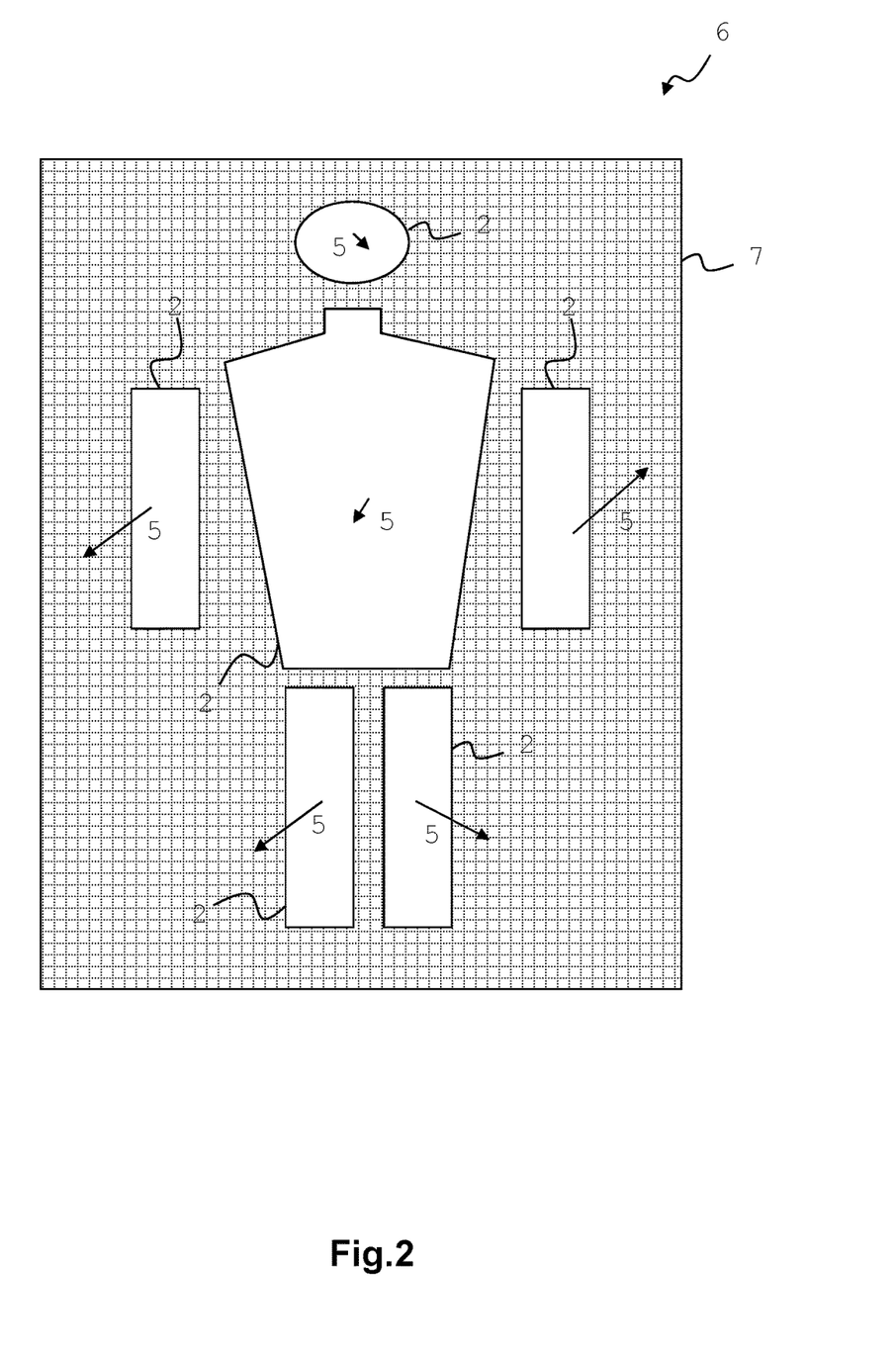
FIG. 2 a comparison body surface is illustrated.

FIG. 2 shows a comparison body surface 6 according to the present disclosure. The comparison body surface is displayed in a coordinate system 7. Special regions 2 of a body surface are illustrated schematically. In the present case, the head and four limbs of a human body are shown alongside the torso as the comparison surface 6. Each of these six regions 2 of the body surface comprises a movement vector 5. In the present case, the movement vector 5 is, at the same time, a position vector because it is imaged with reference to the coordinate system 7. The comparison surfaces 6 illustrated in FIG. 2 are exemplary. In particular, substantially more regions 2 can be provided, which are furnished with individual acceleration vectors and position vectors 5 in order to image a finer body surface.

Figure 3:
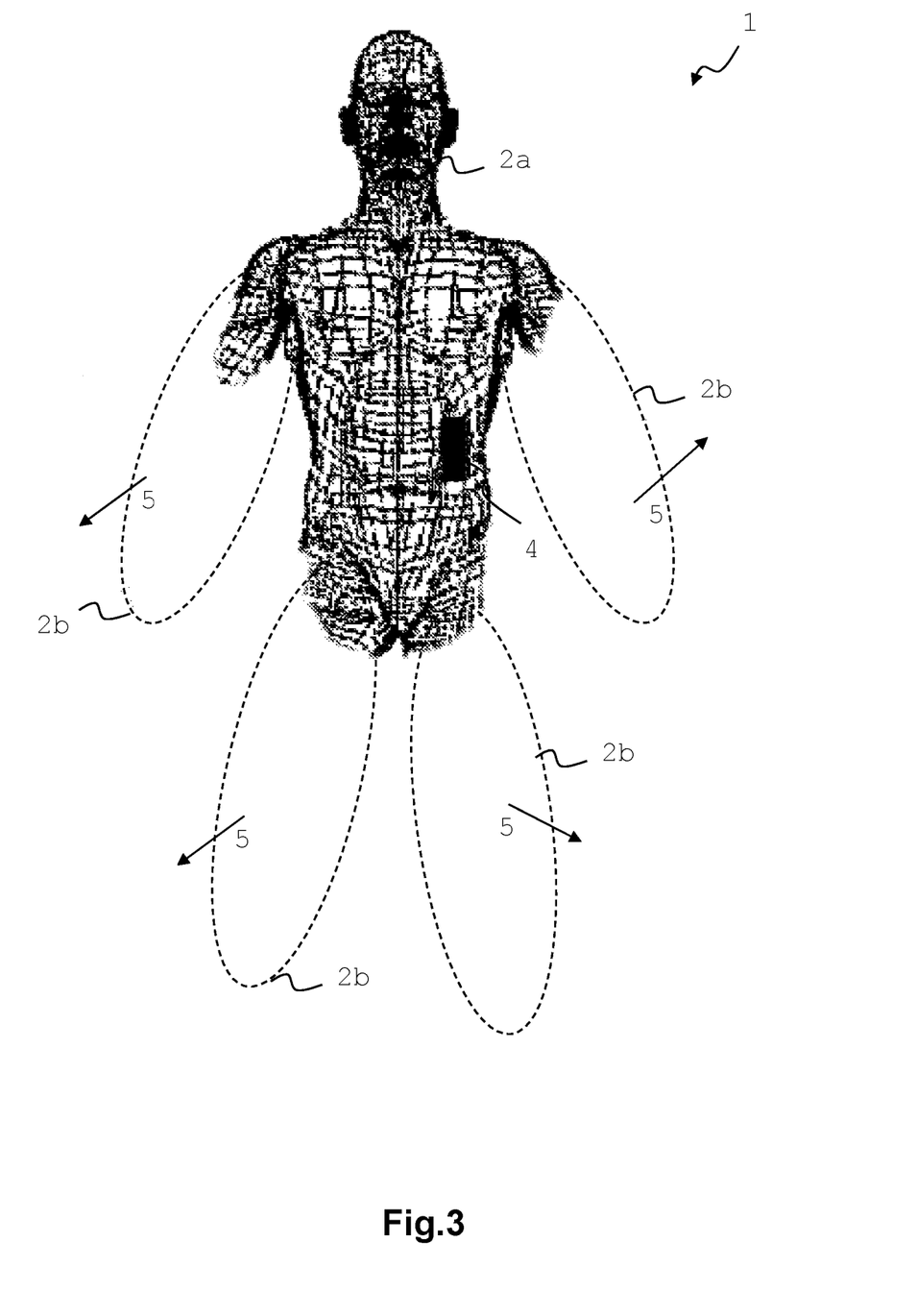
FIG. 3 a 3-D all-round view of a human body with un-registered regions is illustrated.

FIG. 3 shows an incompletely registered 3-D all-round view 1 of a person 11. In this context, regions 2 are marked as registered regions 2a. As shown, four regions 2b which are marked as un-registered are also displayed. This is attributable, for example, to the fact that the person 11 is still disposed at the beginning of a walk-through passageway 9, and the method according to the present disclosure, as specified in comparison step C, has not yet been able to determine an acceleration value 10 which was disposed below the threshold value.

An object 4, which is recognisable only on the basis of the registration device 8 operating with microwave radiation, is shown on the torso of the body, an already registered region 2a of the body surface. In this case, the person 11 would not be allowed to pass through the security scan without being detained.

If the object 4 were not present, such a 3-D all-round view 1 of a body surface would be used to allow the person 11 who is disposed in the walk-through passageway 9 to pass. However, in such a case, it has not been ascertained that further objects 4 are present in the un-registered regions 2b which would therefore remain undiscovered. In order to exclude this possibility safely, the un-registered regions 2b must also be registered without motion-blurring. This is achieved by the method described above.

Figure 4:
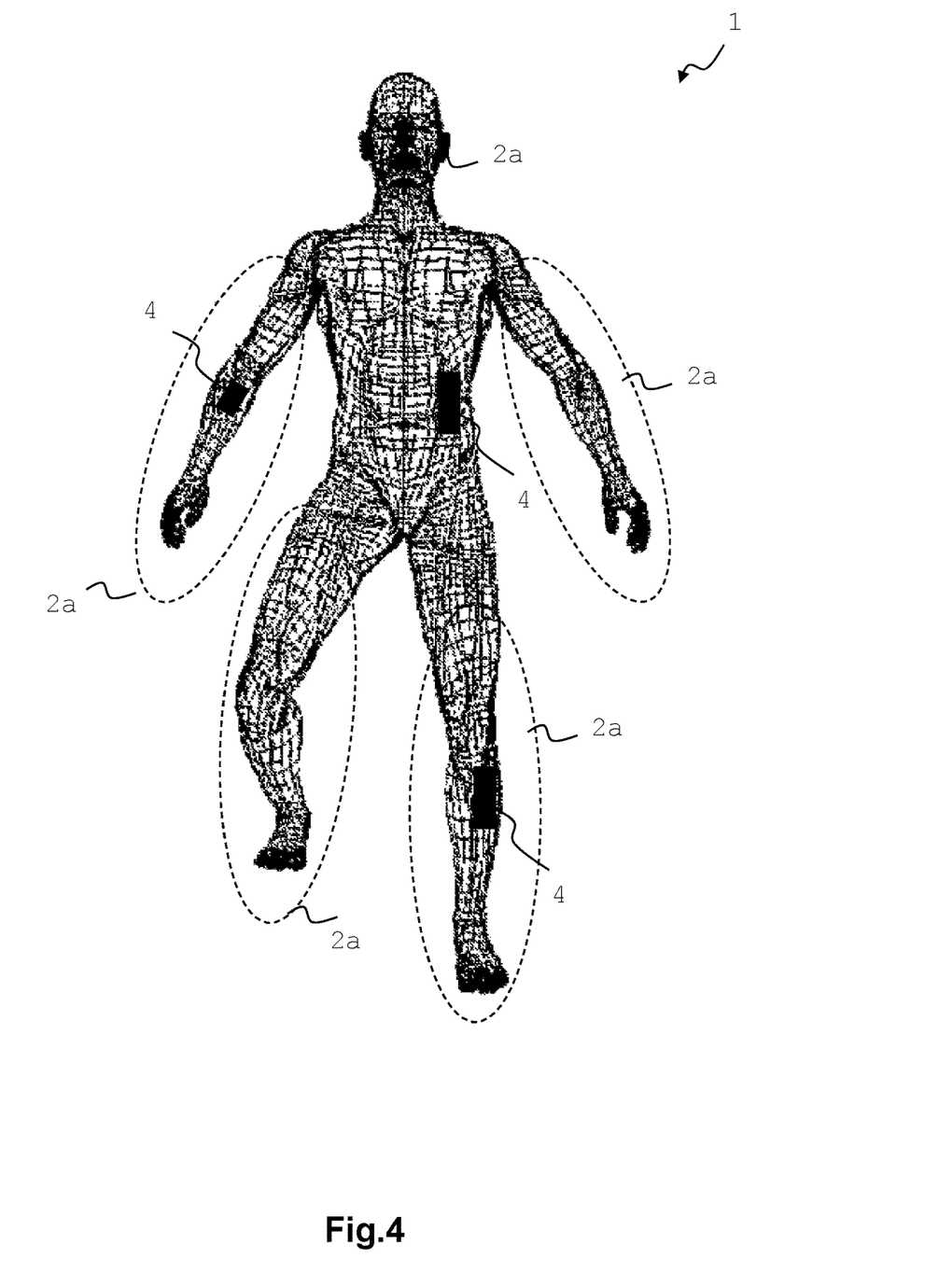
FIG. 4 a complete 3-D all-round view is illustrated.

As shown in FIG. 4, a completed body surface 1 is now displayed in a 3-D all-round view. It is evident that the limbs not yet registered according to FIG. 3 have now been registered by the registration device 8, and a completed body surface is obtained. In this context, completed is understood to mean, in particular, that all of the regions 2 which must be registered according to a comparison body surface 6 have also actually been registered through microwave radiation.

In FIG. 4, it is also evident that a further object 4 has been detected on the left shin. Furthermore, another object 4 has been detected on the right forearm. Non-metallic guns, stabbing knives, explosives and/or smuggled goods should be understood, in particular, as objects 4 to be detected. In the case of a discovery of these objects 4, a person 11 is exposed by a security scan and can be detained accordingly.

Figure 5:
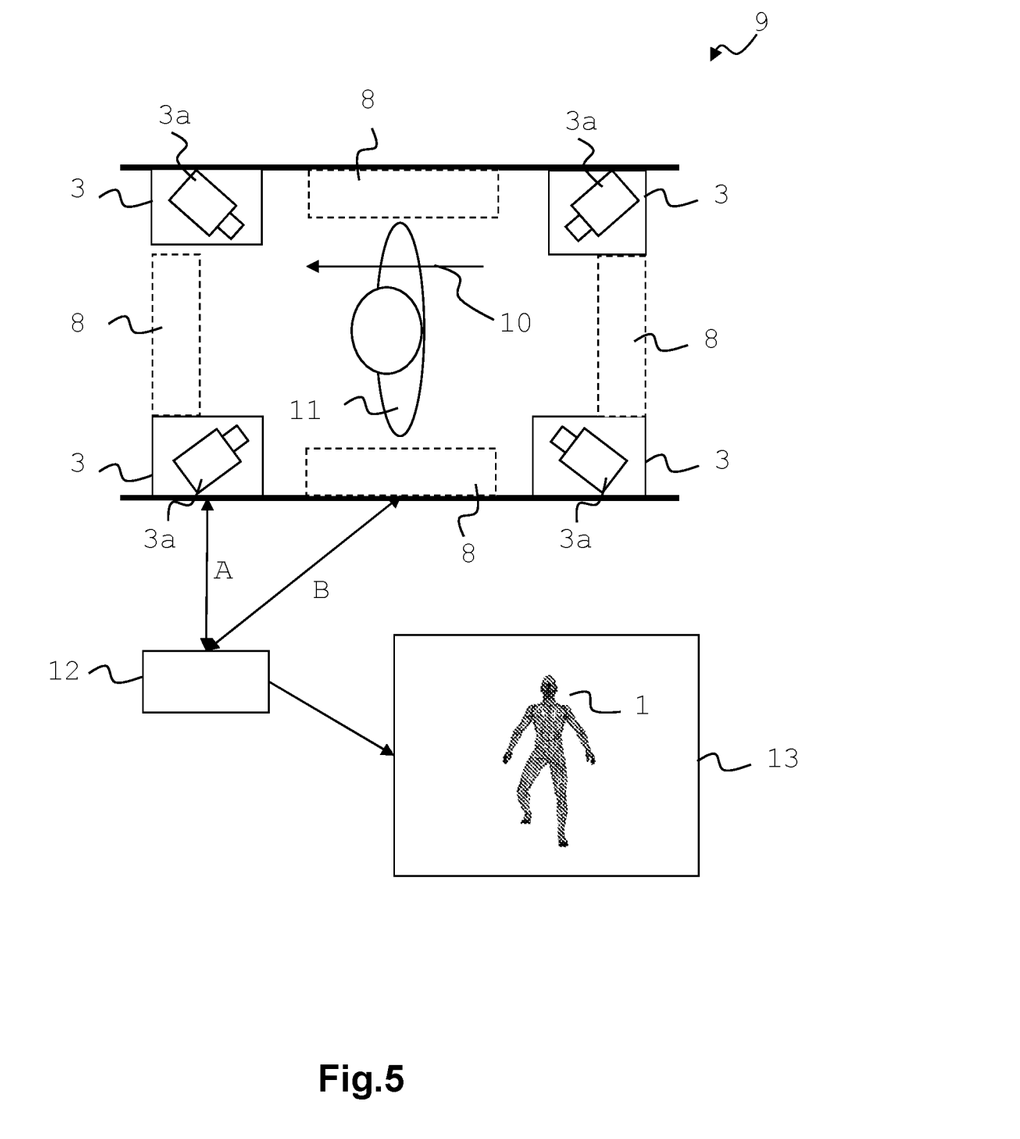
FIG. 5 a device according to a first exemplary embodiment is illustrated.

FIG. 5 shows a device for registering a 3-D all-round view of a human or animal body in accordance with certain embodiments. In this context, a person 11 moves through a walk-through passageway 9. The walk-through passageway 9 is illustrated here in a plan view. The person moves corresponding to the arrow in the movement direction 10, from right to left.

Tracking sensors 3 are arranged in each of the corners of the walk-through passageway 9. The tracking sensors comprise, in particular, a 3-D camera 3a and/or a TOF camera 3b. The number of tracking sensors 3 is not restricted here; it is entirely possible to use more tracking sensors 3. The tracking sensors 3 serve to determine and to track the movement velocity 10 of the person 11.

A dynamic 3-D model with position vectors and movement vectors 8 of the model elements is generated from the data of the tracking sensors 3 as shown in FIG. 2. During the movement of the person 11 through the walk-through passageway 9, millimeter-wave images of the person 11 are captured by means of the registration devices 8. The body regions 2 illuminated by these images are marked in the dynamic 3-D model of the person 11. If it is determined with an evaluation unit 12 that un-registered regions 2b of the body surface are present, the method according to the present disclosure is used. For this purpose, the un-registered regions 2b are marked and the movement vectors respectively position vectors 5 are evaluated. At a timing point at which the movement falls below a threshold value, a region 2 of the body surface 1 is registered by means of the registration device 8, thereby completing the 3-D all-round view 1. The completed 3-D all-round view 1 is displayed by means of a display unit 13.

The method according to the present disclosure provides the triggering of further millimeter-wave images of the person 11, firstly, if significant, previously un-registered regions 2b of the person 11 can be registered at a moment in time by means of the registration system 8 and, secondly, the registered region 2b provides a movement velocity 10 which allows the registration B, and therefore image capture, of the region 2b without motion blurring. Accordingly, a triggering of the image capture is provided dependent upon the movement velocity 10 of the un-registered regions 2b. This ensures that no motion blurring is included. In this manner, a device can be obtained, which operates with a high resolution and complete illumination of a person 11. At the same time, technically and financially effort-intensive measurements and reductions in reconstruction time are achieved.

Within the scope of the present disclosure, all of the elements described and/or illustrated and/or claimed can be combined arbitrarily with one another. For example, arbitrary other cameras can be used instead of TOF cameras.

The invention claimed is:

1. A method for registering an all-round view of a moving human or animal body surface, the method comprising steps of:
   determining a movement velocity of at least one region of the body surface;
   detecting the at least one region of the body surface at a time at which the value of the movement velocity of the one region falls below a defined threshold value; and
   before the determining step, another region of the body surface already registered by means of microwave rays is marked on the basis of a three-dimensional model.

2. The method according to claim 1, wherein:
   detecting step relates to at least one un-registered region of the body surface by means of microwave radiation for the purpose of completion of the three-dimensional all-round view.

3. The method according to claim 2, wherein:
   before the marking, a step of evaluation is implemented, wherein the evaluation comprises a comparison of the actually registered body surface with a comparison body surface.

4. The method according to claim 1, wherein the all-round view is prepared on the basis of a dynamic model by at least one tracking sensor.

5. The method according to claim 1, wherein, for the determination of the movement velocity, position vectors and/or movement vectors of individual regions of the body surface are evaluated.

6. The method according to claim 1, wherein already registered motion-blurred regions of the body surface are marked as un-registered regions.

7. The method according to claim 1, wherein non-body objects are detected by the method.

8. A device for registration of an all-round view of a human or animal body surface moving through a walk-through passageway, the device comprising:
   at least one tracking sensor configured to track a body surface to be registered in the walk-through passageway;
   a marking unit configured to mark regions of body surface by placing position vectors and movement vectors on the individual regions; and
   a detection unit configured to detect at least one region of the body surface at a timing point at which the value of the movement velocity of this region falls below a defined threshold value.

9. The device according to claim 8, further comprising:
   an evaluation unit configured to evaluate the position vectors and movement vectors in order to determine the timing point.

10. The device according to claim 8, wherein the detection unit is a microwave unit set up to detect the region.

11. The device according to claim 8, wherein the tracking sensor comprises a camera for detecting in a three-dimensional manner.

12. The device according to claim 8, wherein the tracking sensor comprises a TOF camera.

13. The device according to claim 8, wherein a plurality of tracking sensors are provided.

14. The device according to claim 8, wherein the detection device is configured in such a manner that already detected motion-blurred regions are detected again with the detection device as un-detected regions.

15. The device according to claim 8, wherein a plurality of detection devices are provided in order to prepare a three-dimensional all-round view.

* * * * *